United States Patent [19]

Futamura

[11] Patent Number: 4,792,653
[45] Date of Patent: Dec. 20, 1988

[54] ELECTRICAL DISCHARGE MACHINING APPARATUS INCLUDING A SHIELD FOR PREVENTING DEFORMATION BY TEMPERATURE

[75] Inventor: Shoji Futamura, Kawasaki, Japan

[73] Assignee: Institute of Technology Precision Electrical Discharge Works, Japan

[21] Appl. No.: 50,494

[22] Filed: May 13, 1987

[30] Foreign Application Priority Data

May 14, 1986 [JP] Japan .................................. 61-110327
May 14, 1986 [JP] Japan .................................. 61-110328

[51] Int. Cl.⁴ ............................................. B23H 7/02
[52] U.S. Cl. ................................. 219/69 R; 219/69 W
[58] Field of Search ................ 219/69 R, 69 W, 69 E; 204/206, 224 M

[56] References Cited

U.S. PATENT DOCUMENTS

| | | | |
|---|---|---|---|
| 2,427,588 | 9/1947 | Burnett | 219/69 E |
| 3,585,342 | 6/1971 | Kosco | 219/69 E |
| 4,647,748 | 3/1987 | Glassman | 219/69 E |
| 4,698,477 | 10/1987 | Aramaki et al. | 219/69 R |
| 4,712,288 | 12/1987 | Lodetti et al. | 29/557 |

FOREIGN PATENT DOCUMENTS

| | | | |
|---|---|---|---|
| 55-83528 | 6/1980 | Japan | 219/69 W |
| 232725 | 12/1984 | Japan | 219/69 R |
| 167722 | 8/1985 | Japan | 219/69 R |
| 191728 | 9/1985 | Japan | 219/69 R |
| 191729 | 9/1985 | Japan | 219/69 R |
| 259333 | 12/1985 | Japan | 219/69 R |
| 259334 | 12/1985 | Japan | 219/69 R |
| 259335 | 12/1985 | Japan | 219/69 R |
| 87/07193 | 3/1987 | PCT Int'l Appl. | 219/69 W |

Primary Examiner—A. D. Pellinen
Assistant Examiner—Geoffrey S. Evans
Attorney, Agent, or Firm—McGlew and Tuttle

[57] ABSTRACT

An electrical discharge machining apparatus having an electrode and a work table on which a workpiece is placed for machining the workpiece by causing an electric discharge between the electrode and the workpiece. A shielding cover for forming a substantially enclosed predetermined space around main structural members comprising the electrical discharging apparatus is provided. A gas is introduced into the space formed by the shielding cover so as to keep the temperature in the space at a constant level.

6 Claims, 3 Drawing Sheets

ELECTRICAL DISCHARGE MACHINING APPARATUS INCLUDING A SHIELD FOR PREVENTING DEFORMATION BY TEMPERATURE

BACKGROUND OF THE INVENTION

1. Field of the Invention

This invention relates generally to an electrical discharge machining apparatus, and more particularly to an electrical discharge machining apparatus adapted to obtain a high machining accuracy by providing a shielding cover for forming a substantially enclosed, predetermined space around main structural members to prevent the main structural members from being deformed by the thermal effects of discharge energy and the changes in the room temperature.

2. Description of the Prior Art

The electrical discharge machining apparatus, or simply the discharge machining apparatus, is usually classified into a wire type discharge machining apparatus using a wire electrode, as shown in FIG. 4, and a discharge machining using an electrode, made of graphite, for example, formed into a shape corresponding to a shape to be machined (hereinafter referred to as a profile discharge machining apparatus—not shown). As is widely known, both the wire type discharge machining apparatus and the profile discharge machining apparatus have essentially the same machining principle and machine construction consisting of a bed, a column and other main structural members.

FIG. 4 shows a basic construction of the wire type discharge machining apparatus of the conventional type. In the figure, reference numeral 1 refers to a bed; 2 to a column; 3 to an upper arm; 4 to a lower arm; 5 to a wire electrode; 6 to an electrode pay-off reel; 7 to a take-up reel; 8 to an upper guide; 9 to a lower guide; 10 to a UV table driven by a control unit (not shown) for controlling the position of the upper guide 8; 11 to an XY table driven by a control unit (not shown) in two orthogonally intersecting directions; 12 to a workpiece; and 13 to a workpiece support, respectively.

The wire type discharge machining apparatus shown in FIG. 4 performs discharge machining of the workpiece 12 by supplying discharge energy from a power supply (not shown) to cause an electric discharge between the wire electrode 5, which travels as it is wound up by the take-up reel 7, and the workpiece 12. Needless to say, a working fluid (distilled water, for example) is fed to the machining part of the apparatus from a working fluid supply unit (not shown).

In the discharge machining described above, a desired shape is machined by performing the positional control of the workpiece 12 on the XY table 11 and the positional control of the upper guide 8 on the UV table 10 by means of an NC and other appropriate control means.

It is no exaggeration to say that the machining accuracy of the wire type discharge machining apparatus shown in FIG. 4 depends solely on how accurately the relative positions of the upper guide 8, the lower guide 9 and the workpiece 12 are controlled. However, the bed 1, the column 2, the upper arm 3, the lower arm 4 and other main structural members of the conventional electrical discharge machining apparatuses, such as the wire type discharge machining apparatus shown in FIG. 4, have heretofore been fabricated by casting, sheet metal welding and other metal-working processes.

As a consequence, these main structural members are subject to the deformation (expansion and shrinkage) caused by temperature changes. For this reason, a high machining accuracy cannot be maintained because deformation of the upper arm 3, the lower arm 4, the column 2 or any other main structural member causes a relative positional displacement between the upper guide 8 and the lower guide 9 no matter how accurately the UV table 10 and the XY table 11 are controlled. The following factors are as possible sources for the temperature changes that cause deformation of the main structural members.

(i) Eddy-current losses caused by discharge current in the main structural members that are magnetic materials.

(ii) Changes in the room temperature.

(iii) Increased temperature of working fluid due to discharge energy.

(iv) Heat generated by electrical components used.

In general, electrical discharge machining apparatuses are operated continuously for long hours (for a few days, for example). The present Applicant measured temperatures of the room temperature, and the upper arm, lower arm, column, and working fluid of a wire discharge machining apparatus of the conventional type that was operated for a few days (measurement results are shown in FIG. 5). In FIG. 5, arrow a (Δ---Δ) indicates the temperature change in the upper arm, b (●---●) that in the lower arm, arrow c (□---□) that in the column, d (X---X) that in the working fluid, and e (o---o) the change in the room temperature, respectively. As to machining errors, measurements ranging from +15 μm to −20 μm in the X direction, and from +5 μm to −10 μm in the Y direction were obtained. Those machining errors were found occurring irregularly with the lapse of time.

According to the measurements, the temperatures of various parts of the apparatus change rather irregularly, with the consequence that the deformation of the upper arm, lower arm, column, etc. takes place irregularly. This leads to the failure to ensure consistent machining accuracy, as noted earlier.

The discharge machining apparatus of the conventional type, main structural members of which are usually made of cast metal parts or welded metal sheets, tends to cause distortion after the lapse of time, posing an unwanted problem of secular changes.

Furthermore, the discharge machining apparatus of the conventional type involves not only the aforementioned deformation of the main structural members but also lowered machining performance due to the deteriorated discharge current waveform resulting from the main structural members made of magnetic materials.

SUMMARY OF THE INVENTION (1) It is an object of this invention to provide an electrical discharge machining apparatus having an electrode and a work table on which a workpiece is placed for carrying out machining by causing an electric discharge between the electrode and the workpiece, in which a shielding cover for forming a substantially enclosed, predetermined space around main structural members comprising the discharge machining apparatus is provided; and a gas is introduced into the space formed by the shielding cover to keep the temperature in the space at a constant level so as to prevent the main structural members from being deformed (expanded or shrunk) due to the thermal effects of discharge energy and the changes in the room temperature, and thereby ensuring discharge machining with high accuracy.

(2) It is another object of this invention to provide an electrical discharge machining apparatus whose structural members are made of non-magnetic materials so as to prevent eddy-current losses (or the head caused by eddy-current) in the main structural members and deterioration of discharge current waveform, and thereby improve machining accuracy and performance.

DETAILED DESCRIPTION OF THE INVENTION

Figure 1:
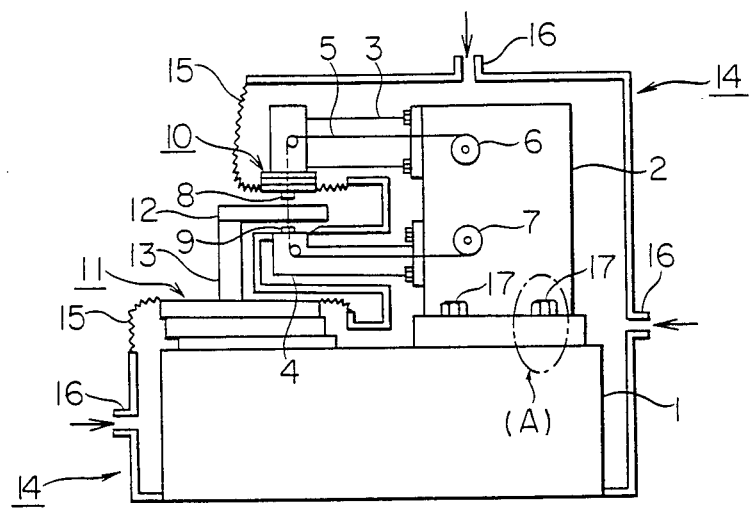
FIG. 1 is a diagram illustrating the construction of an embodiment of this invention.

FIG. 1 shows an electrical discharge machining apparatus embodying this invention. In the figure, reference numeral 14 refers to a shielding cover; 15 to a bellows; 16 to a gas inlet; and other numerals correspond with those in FIG. 3.

In FIG. 1, a shielding cover 14 is used for defining a substantially enclosed, predetermined space around the main structural members. On a part of the shielding cover 14 provided is a bellows 15 to allow a UV table 10 and an XY table 11 to travel. Gas inlets 16 and gas outlets (not shown) are also provided at a plurality of locations on the shielding cover 14. A gas is introduced into the space formed by the shielding cover 14 through the gas inlets 16 to keep temperature and humidity in the space at constant levels. The temperature and humidity of the gas introduced through the gas inlets 16 are controlled in accordance with the temperature and humidity in the space.

In this way, by keeping the temperature and humidity in the space formed by the shielding cover 14 constant, the main structural members are prevented from being deformed as well as the metallic parts existing in the space are prevented from rusting.

Next, another embodiment of this invention will be described, in which the bed 1, column 2, upper arm 3 and lower arm 4 comprising the main structural members in the embodiment shown in FIG. 1 are made of ceramic materials which are non-magnetic materials. The diagram illustrating the construction of the embodiment in question is FIG. 1, common to the previous embodiment described above. That is, a substantially enclosed, predetermined space is formed around the main structural members by the shielding cover 14 so as to keep the temperature and humidity in the inside of the space at constant levels, as in the case with the embodiment shown in FIG. 1. For convenience of description, the abovementioned embodiment shown in FIG. 1 is referred to as a first embodiment, and another embodiment in which the main structural members are made of ceramics as a second embodiment.

Ceramics used as materials for the main structural members in the second embodiment are non-magnetic materials. By constructing the main structural members of ceramics, the following benefits are imparted, together with the benefits offered by the first embodiment:

(i) The fact that the main structural members are made of non-magnetic materials eliminates the eddy-current losses caused by discharge current (or the heat generated by eddy currents).

(ii) The extremely low thermal expansion coefficient of the ceramics used makes it possible to prevent thermal effects, such as room temperature changes, the temperature rise of the working fluid, and the heat generated by the electrical components.

(iii) Ceramic materials are less susceptible to physical changes as experienced by cast metal parts and welded metal sheets.

Moreover, by constructing the main structural members of ceramic materials, the discharge current waveform is prevented from being deteriorated. This leads to improved machining performance. Although ceramics are usually vulnerable to impact force, constructing the main structural members of ceramic materials poses no problems since the discharge machining apparatus is in nature free from impact force during machining. To make up for the vulnerability of ceramics to impact force, however, the shielding cover 14 has an effect of protecting the main structural members from the impact force applied from the outside. The shielding cover 14 should preferably be formed by a non-magnetic material, such as a synthetic resin, to prevent discharge current waveform from being deterioated.

In the second embodiment described above, the bed 1 is also made of a ceramic material. The deteriorated machining accuracy resulting from the deformation of the main structural members is usually associated with a positional displacement between the upper guide 8 and the lower guide 9. One of the factors greatly affecting such a positional displacement is deformation of the upper arm 3 which holds the upper guide 8 via the UV table 10; the lower arm 4 holding the lower guide 9; and/or the column 2 to which the upper arm 3 and the lower arm 4 are fixedly fitted. Consequently, it is recommended that at least the upper arm 3, the lower arm 4 and the column 2 be made of ceramics.

Figure 2:
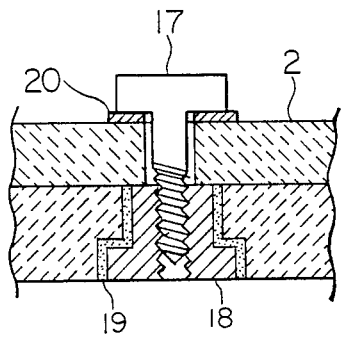
FIG. 2 is a cross-sectional view of the part encircled in FIG. 1, as shown by arrow (A).

In the second embodiment, a commonly used fastening means, such as bolts, is used to fixedly fit the column 2 to the bed 1. Ceramics, however, are lower in mechanical strength and brittle compared with iron and other materials. To cope with this, a fitting means as shown in FIG. 2 is used in the second embodiment. That is, a metal bush 18, on which a threaded hole to match the thread of the bolt 17 is formed, is provided on the bed 1 via a cement compound (as used with insulators). The column 2 is fixedly fitted to the bed 1 by the bolt 17 via a spring washer 20. The spring washer 20 serves not only as a means to cushion the impact force applied during tightening but also as a means to absorb the expansion and contraction difference resulting from the difference in thermal expansion coefficient between the bolt 17 and ceramic materials. Fitting means for fastening the upper arm 3 and the lower arm 4 to the column 2 are similar to the abovementioned fitting means.

Figure 3:
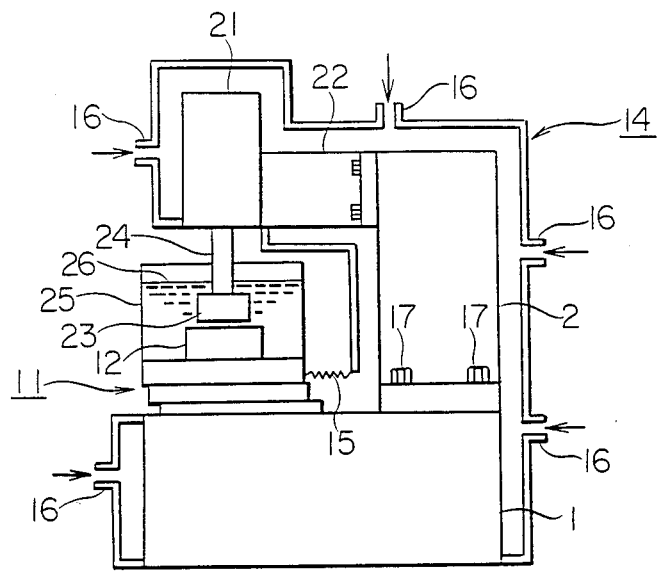
FIG. 3 is a diagram illustrating the construction of another embodiment of this invention.
Figure 4:
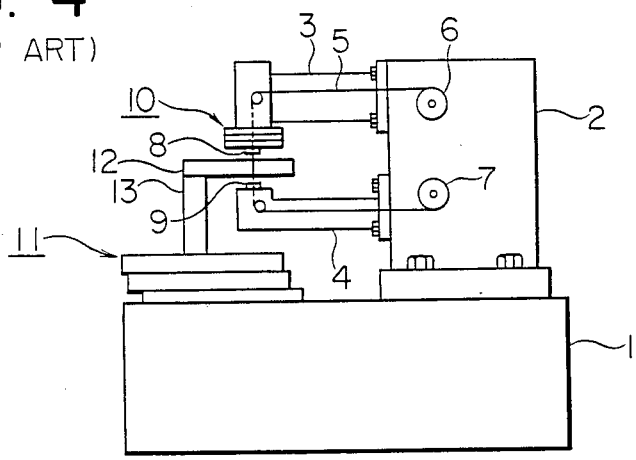
FIG. 4 is a diagram illustrating the construction of an electrical discharge machining apparatus of the conventional type.
Figure 5:
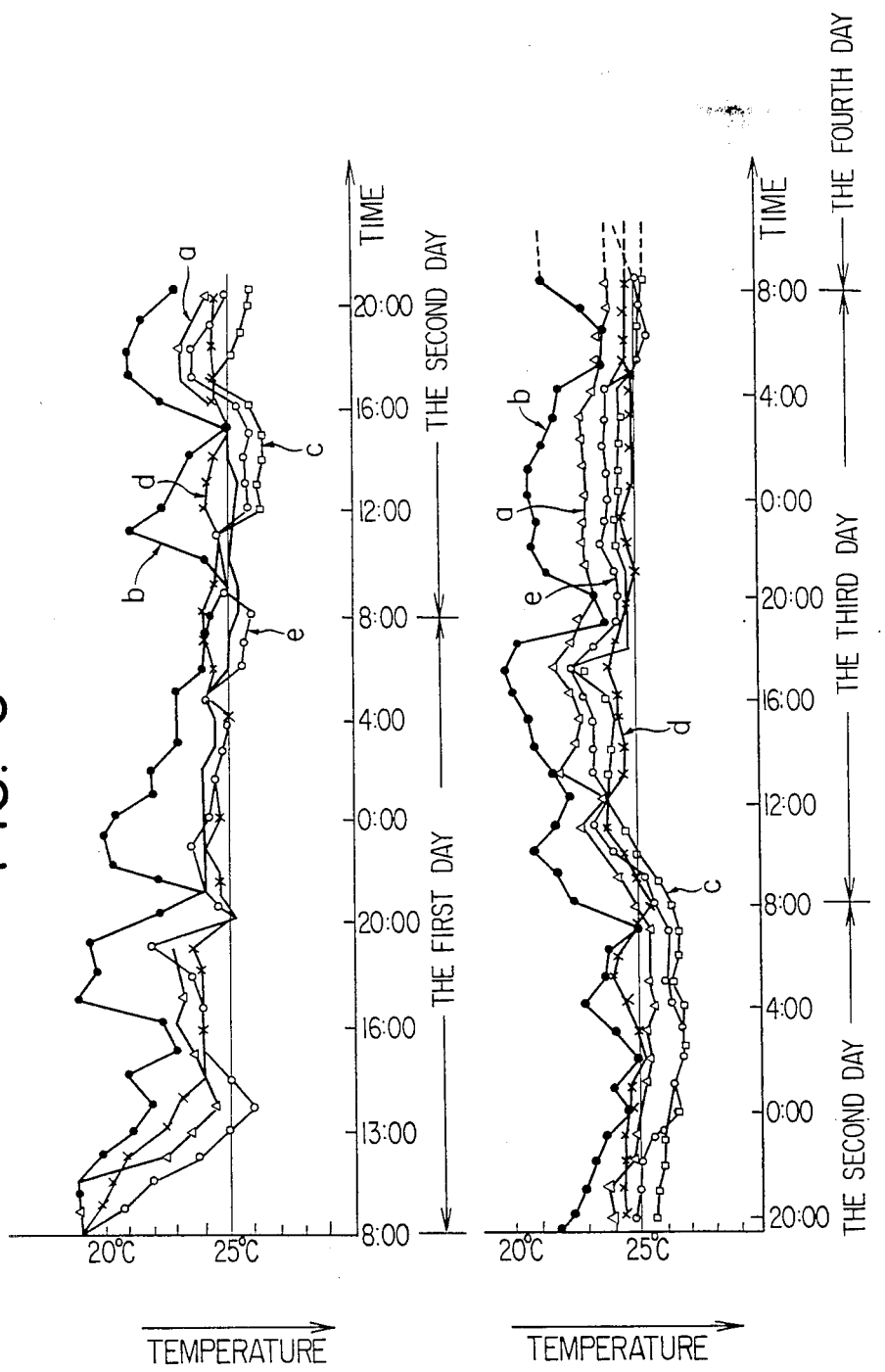
FIG. 5 shows measurements of temperature changes in a wire discharge machining apparatus of the conventional type.

The embodiment shown in FIG. 3 is a profile discharge machining apparatus according to this invention, whose construction is basically the same as the embodiment (the first embodiment) shown in FIG. 1. That is, the bed 1, the column 2 and the arm 22 as the main structural members are covered by the shielding cover 14 in such a manner so as to form a predetermined space around the main structural members. The main structural members are prevented from being unwantedly deformed by keeping the temperature and humidity in the space at constant levels by introducing a gas into the inside of the space through the gas inlets 16, 16, provided at a plurality of locations on the shielding cover 14. In the figure, reference numeral 21 refers to a machining head; 22 to an arm for supporting the machining head 21; 23 to a machining electrode; 24 to a spindle for feeding the machining electrode 23; 25 to a machining bath; 26 to a working fluid; and other numerals corresponds to those in FIG. 1.

Furthermore, the bed 1, the column 2, and the arm 22 comprising the main structural members in the embodiment shown in FIG. 3 may be made of ceramics which are non-magnetic materials. For convenience of description, the embodiment shown in FIG. 3 is referred to as a third embodiment, and still another embodiment in which the main structural members in the third embodiment are made of ceramics is referred to as a fourth embodiment.

The fourth embodiment has the same effects as the second embodiment because the bed 1, the column 2 and the arm 22 of the fourth embodiment are made of ceramic materials that are non-magnetic materials having low thermal expansion coefficient to prevent the unwanted deformation of the bed 1, the column 2 and the arm 22 and the deterioration of discharge current waveform, and thereby improve machining accuracy and performance. The effects expected by installing the shielding cover are similar to those expected in the first, second and third embodiments.

Ceramics applicable to this invention include the so-called old ceramics that are well known in the trade, and the so-called new ceramics (also called fine ceramics) that have been developed relatively recently. The new ceramics are more desirable because of their excellent mechanical strength, heat resistance, thermal expansion, resistance to chemicals, etc., compared with the old ceramics. Even when the old ceramics are used in place of the new ones which are usually expensive, however, practically the same effects can be expected.

Although it has been described that ceramics are used as materials for the main structural members of this invention, this invention is not limited to ceramics, but other non-magnetic materials having high rigidity, such as composite materials using carbon fibers, may be used instead.

As described above, this invention makes it possible to prevent main structural members from being deformed (expanded and shrunk) by the thermal effects of discharge energy and room temperature changes by providing a substantially enclosed space around the main structural members so as to keep the temperature of the space at constant levels, and thereby ensure discharge machining with high accuracy. Furthermore, by constructing the main structural members of non-magnetic materials, the effects of preventing deformation due to the temperature changes described above can be further enhanced, and discharge current waveform can be prevented from being deteriorated. Thus, machining performance can be improved.

What is claimed is:

1. An electrical discharge machining apparatus comprising: an electrode; a column supporting said electrode; a work table for support of a workpiece machining being formed by an electrical discharge between said electrode and said workpiece, said column being formed of non-magnetic materials, wherein said non-magnetic materials includes ceramics.

2. An electrical discharge machining apparatus comprising: a bed, a column formed of non-magnetic material, said column being connected to said bed; a work table for supporting a workpiece to be machined, said work table being connected to said bed; an electrode connected to said column for closing an electric discharge between said electrode and said workpiece; and, a shielding cover surrounding said column and said bed for forming a substantially enclosed, predetermined space, said shielding cover having gas inlets for introduction of a gas into said predetermined space in the interior of said shielding cover to maintain the temperature in said predetermined space at a constant level, wherein said non-magnetic material is a ceramic.

3. An electrical discharge machining apparatus comprising: a bed; a column formed of non-magnetic material, said column being connected to said bed; a work table for supporting a workpiece to be machined, said work table being connected to said bed; an electrode connected to said column for closing an electric discharge between said electrode and said workpiece; and, a shielding cover surrounding said column and said bed for forming a substantially enclosed, predetermined space, said shielding cover having gas inlets for introduction of a gas into said predetermined space in the interior of said shielding cover to maintain the temperature in said predetermined space at a constant level, wherein said shield surrounds an arm attached to said column for support of said electrode.

4. An electrical discharge machining apparatus according to claim 3, wherein: said electrical discharge machining apparatus includes a wire electrode.

5. An electrical discharge machining apparatus comprising: a bed formed of non-magnetic materials; a column attached to said bed, said column being formed of non-magnetic materials; a work table connected to said bed, said work table being formed of non-magnetic materials, said work table being adapted to support a workpiece for performing machining on the workpiece; an arm connected to said column, said arm being formed of non-magnetic material; an electrode supported by said column and said arm, said electrode adapted to cause an electric discharge between said electrode and said workpiece; a shielding cover surrounding said arm, column, and bed for forming a substantially enclosed, predetermined space; and, gas inlet means for introducing gas into said predetermined space for maintaining the temperature in said space at a predetermined constant level.

6. An electrical discharge machining apparatus according to claim 5, futher comprising: a spindle for feeding said electrode, said spindle being attached to said arm; and, a machining bath supported by said work table, said machining bath surrounding said electrode and said workpiece and being filled with a working fluid.

* * * * *